United States Patent
Kaplan et al.

(10) Patent No.: US 7,502,409 B2
(45) Date of Patent: Mar. 10, 2009

(54) MOBILE BROADBAND MODEM AND RELATED ACCESS SHARING TECHNIQUE

(75) Inventors: Diego Kaplan, San Diego, CA (US); Thomas J. Vaccaro, Encinitas, CA (US); Bryan Ireland, San Diego, CA (US); Joseph Zeff, Cambridge, MA (US); Christopher Maddox, Oceanside, CA (US)

(73) Assignee: Kyocera Wireless Corp., San Diego, CA (US)

( * ) Notice: Subject to any disclaimer, the term of this patent is extended or adjusted under 35 U.S.C. 154(b) by 745 days.

(21) Appl. No.: 11/051,271

(22) Filed: Feb. 3, 2005

(65) Prior Publication Data

US 2006/0034311 A1 Feb. 16, 2006

Related U.S. Application Data

(60) Provisional application No. 60/601,516, filed on Aug. 13, 2004.

(51) Int. Cl.
*H04B 1/38* (2006.01)
(52) U.S. Cl. ...................................... 375/222
(58) Field of Classification Search ................ 375/222, 375/220; 370/338, 333, 351, 352; 455/552, 455/553
See application file for complete search history.

(56) References Cited

U.S. PATENT DOCUMENTS

| 5,590,133 | A | 12/1996 | Billstrom et al. |
| 5,797,099 | A | 8/1998 | Ejzak et al. |
| 5,854,786 | A | 12/1998 | Henderson et al. |
| 5,999,294 | A * | 12/1999 | Petsko ................ 398/115 |
| 6,519,252 | B2 | 2/2003 | Sallberg |
| 6,526,034 | B1 | 2/2003 | Gorsuch |
| 6,600,734 | B1 | 7/2003 | Gernert et al. |
| 6,618,013 | B1 * | 9/2003 | Aldous ................ 343/702 |
| 6,882,854 | B2 * | 4/2005 | Kobayashi ............ 455/502 |
| 2002/0160769 | A1 | 10/2002 | Gray |

OTHER PUBLICATIONS

Fleishman, Glenn, "Wireless Junxion Box will make auditors' lives easier", The Seattle Times, pp. 1-5, Jun. 21, 2004.

* cited by examiner

*Primary Examiner*—Khai Tran

(57) ABSTRACT

An exemplary mobile broadband modem for network access comprises a processor coupled to an I/O interface capable of being communicably coupled to a plurality of computers, a transceiver coupled to an antenna and the processor, and a network sharing module executed by the processor that establishes a network connection via the transceiver and allows computer to then utilize the network connection. The mobile broadband modem may include a chassis for securing the PC card modem transceiver within the chassis.

25 Claims, 4 Drawing Sheets

MOBILE BROADBAND MODEM AND RELATED ACCESS SHARING TECHNIQUE

RELATED APPLICATIONS

This application claims the benefit of U.S. Provisional application Ser. No. 60/601,516, filed Aug. 13, 2004, which is hereby incorporated by reference.

FIELD OF THE INVENTION

The present invention relates to the field of wireless communication devices. More specifically, the invention relates to wireless broadband modem devices.

BACKGROUND OF THE INVENTION

With the advent of the global information network, known as the "Internet," the capability of connecting to and accessing the resources available on the Internet has increased in recent years. For example, Internet service providers ("ISPs") provide moderate access speed to the Internet over analog telephone lines, whereas increased "broadband" speed is available over digital subscriber lines ("DSL") and cable modem connections. Other high-speed data lines are also known.

In general, wired high-speed connections, such as those available via DSL and cable services, can be configured to be shared by a group of computers without dramatically affecting the perceptible performance of any one computer in the group. For example, routers are capable of sharing a single Internet connection among a network of computers, thereby allowing each computer in the network to access resources on the Internet. Unfortunately, current Internet access sharing devices, such as routers, have a number of drawbacks. Most significantly, known routers are generally limited to fixed connection points. Thus, a router capable of sharing DSL or cable connections requires a connection to the DSL or cable line, typically via a DSL or cable modem. Since, DSL and cable lines are established at fixed locations, the usefulness of such an Internet access sharing arrangement is limited to a geographic region proximate the fixed location.

More recently, the capabilities of connecting to and accessing the Internet has been implemented in certain wireless communication devices, such as mobile phones. However, mobile phones are generally regarded as standalone devices, where access to Internet resources is typically carried out directly via the mobile phone interface, i.e., via applications executed on the mobile phone. Currently, however, the use of mobile phones for accessing resources from Internet has been limited for a variety of reasons. One reason is that the data rate (or bandwidth) provided to most wireless communications devices is typically limited. Secondly, mobile phones have small displays, thereby limiting the viewing of large documents. Third, the limited controls available on mobile phones make navigation and data entry cumbersome. These and other factors negatively impact the user's experience in accessing Internet resources on the mobile phone.

Furthermore, although some mobile phones can be connected to a computer via a special cable or interface (e.g., a PCMCIA mobile phone), use of the mobile phone for connecting to the Internet in this fashion is generally limited to and intended for a single computer user. This is because of the enduring understanding in field of wireless communication devices that mobile phones and their adapter variants, such as PCMCIA mobile phones, are single-user standalone devices.

Accordingly, there is a strong need in the art to address these and other deficiencies present in known Internet access techniques.

SUMMARY OF THE INVENTION

A mobile broadband modem for network access sharing is disclosed which addresses and resolves one or more of the disadvantages associated with wired routers and single user network access devices.

By way of illustration, an exemplary mobile broadband modem comprises a processor coupled to an I/O interface capable of being communicably coupled to a plurality of computers, a transceiver coupled to an antenna and the processor, and a network sharing module executed by the processor that establishes a network connection via the transceiver and allows the computers to then utilize the network connection. The mobile broadband modem typically comprises a cell phone or PC card modem to house the transceiver and antenna. In another embodiment, the mobile broadband modem does not include a cell phone or PC card modem, but rather is configured to receive and utilize such standalone devices for their wireless communication capabilities.

According to one particular embodiment, the chassis of the mobile broadband modem is used to secure a PC card modem within. In this exemplary configuration, provisions are made to access physical features of the PC card modem while it remains secured within the mobile broadband modem.

According to various embodiments of the invention, one or more of the following benefits may be realized by the mobile broadband modem including, for example, mobility of computers that require a network connection, reduction cumbersome wiring infrastructure, multiple station network access via a single wireless port, and increased options for wireless Internet access. In addition, the various embodiments provide for reduced manufacturing and design cost of the mobile broadband modem by using existing standalone devices. Further, manufactures will have the option of readily interchanging major components, thus providing for multiple supplier options and ease of performance upgrades.

Other features and advantages of the present invention will become more readily apparent to those of ordinary skill in the art after reviewing the following detailed description and accompanying drawings.

DETAILED DESCRIPTION OF THE INVENTION

Figure 1:
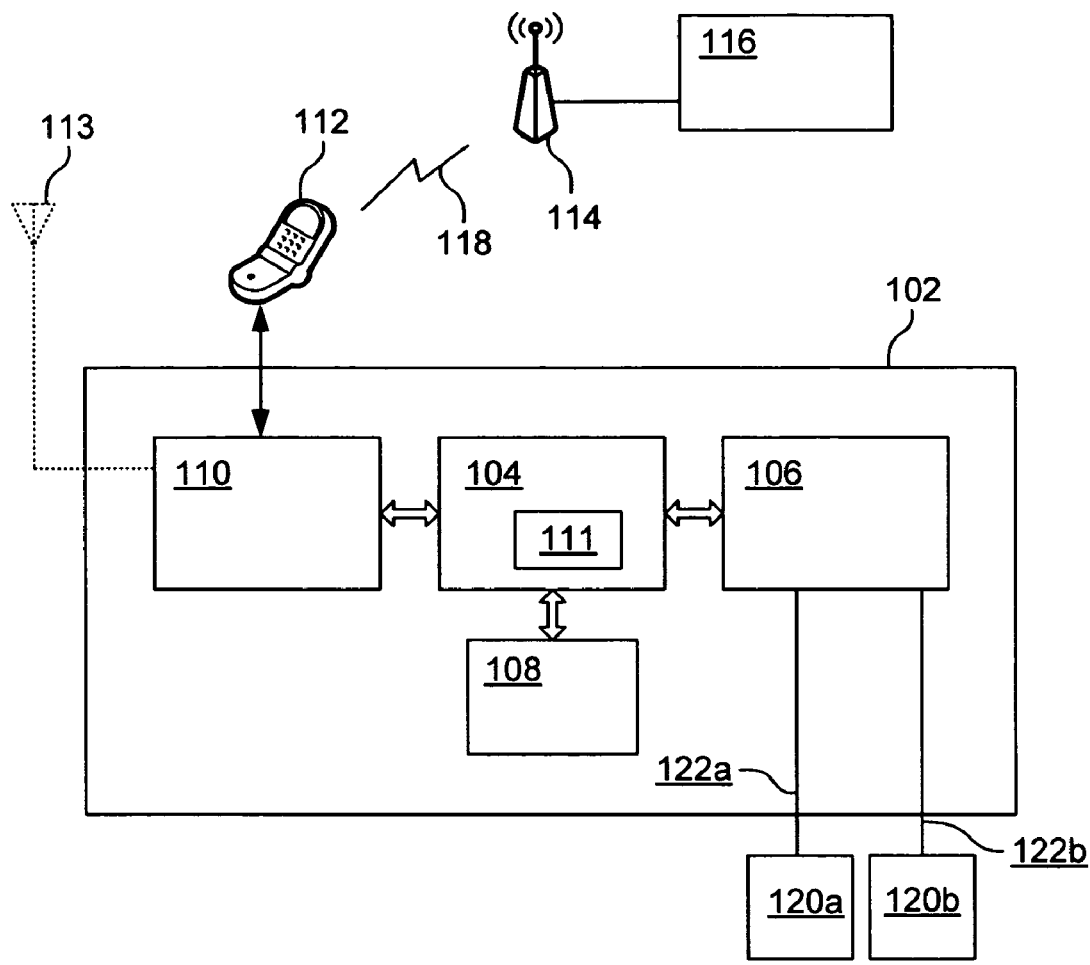
FIG. 1 illustrates an exemplary mobile broadband modem configured to communicably couple with a mobile phone according to one embodiment of the present invention.

Referring first to FIG. 1, there is shown a simplified block diagram of exemplary mobile broadband modem 102 according to one embodiment of the present invention. Mobile broadband modem 102 includes processor 104 coupled to memory 108 and to input/output ("I/O") interface 106. Processor 104 is also coupled to mobile phone interface 110. A power source (not shown) supplies power to mobile broadband modem 102 and may be a mobile power supply, such as a battery, or a fixed power supply, such as wired AC or DC power supply, for example.

Figure 4:
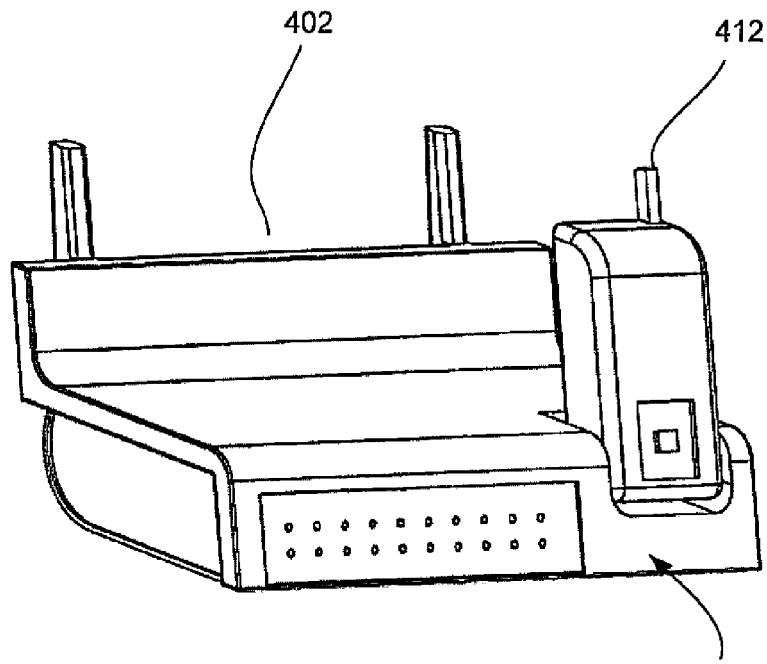
FIG. 4 depicts an exemplary arrangement of mobile phone interface of a mobile broadband modem configured as a cradle for receiving a mobile phone according to one embodiment of the present invention.

Continuing with FIG. 1, mobile phone interface 110 is configured to communicably couple mobile phone 112 to processor 104. For example, mobile phone interface 110 may be a cradle for receiving a portion of the housing of mobile phone 112 and may have electrical interconnects for coupling to data lines of mobile phone 112. By way of illustration, FIG. 4 depicts an exemplary arrangement of mobile phone interface 410 of mobile broadband modem 402 configured as a cradle for receiving mobile phone 412. In other embodiments, mobile phone interface 110 may provide other arrangements for communicably coupling mobile phone 112 to processor 104, such as via wireless connections, for example. Mobile phone 112 communicates information by transmitting and receiving electromagnetic ("EM") energy in the radio frequency ("RF") band via an antenna coupled to a transceiver (not shown for ease of illustration). In this way RF communication link 118 can be established for exchanging voice and/or data communication between mobile phone 112 and base station 114. Although single base station 114 is depicted in FIG. 1 for illustrative purposes only, mobile phone 112 is typically capable of communicating with one or more base stations, where each base station is generally responsible for managing cellular communications with defined geographic regions, such as cellular regions. In certain embodiments, external secondary antenna 113 may be used to increase the RF performance of mobile phone 112, e.g., in a diversity arrangement in conjunction with the antenna on mobile phone 112 or as a substitute for the antenna provided on mobile phone 112.

As shown in FIG. 1, base station 114 is further connected to mobile switching center ("MSC") 116. MSC 116 manages communications between base station 114 and other voice and/or data networks (not shown), such as the Internet and the public switched telephone network (PSTN), for example.

According to one embodiment of the invention, mobile phone interface 110 may provide an alternative connection to processor 104 such that a second mobile phone (not shown) having a data line arrangement different from that of mobile phone 112 can be communicably connected to processor 104. By way of illustration, mobile phone interface 410 in FIG. 4 may be detached from mobile broadband modem 402 and replaced by a second mobile phone interface (not shown) for coupling the second mobile phone to processor 104.

Continuing with FIG. 1, I/O interface 106 provides an interface to one or more data processing devices, generally designated as computers 120a and 120b. In the exemplary embodiment depicted in FIG. 1, a physical connection between I/O interface 106 and computers 120a and 120b is represented by lines 122a and 122b, respectively, which may be any type of data connection, such as network cabling, for example. In other embodiments, as described further below in conjunction with FIG. 3, mobile broadband modem 102 may provide alternative and/or additional connections to data processing devices, such as via wireless connections, for example.

Network sharing module 111 comprises computer executable code executed by processor 104 and provides a number of network services, such as connecting services, firewall services, network address translation (NAT) services, proxy services, dynamic host configuration protocol (DHCP) services, and/or administration services, for example.

In operation, network sharing module 111 establishes a network communication connection by way of mobile phone 112. More particularly, network sharing module 111 establishes a data connection to base station 114 over RF link 118 via the transceiver and antenna of mobile phone 112. By way of illustration, in certain North American CDMA cellular network markets, a broadband data connection, referred to as evolution data only ("EVDO"), may be established between mobile phone 112 and base station 114. Other connection techniques, such as dial-up Point-to-Point protocol ("PPP") for example, may also be used for establishing the connection between mobile phone 112 and base station 114. As part of negotiating an Internet data connection between mobile phone 112 and base station 114, mobile phone 112 will be assigned a wide area network IP address ("WAN IP Address") which is shared with mobile broadband modem 102. Other configuration parameters, such as the default DNS server IP address and the gateway IP address, are also typically defined during this process. Once the Internet connection between mobile phone 112 and base station 114 is established, mobile broadband modem 102 is able to access resources on the Internet via MSC 116.

Network sharing module 111 further provides the capability of sharing the established Internet connection with computers 120a and 120b. For example, each of computers 120a and 120b may be assigned an "internal" local area network IP address ("LAN IP address"), and network sharing module 111 routes Internet data traffic appropriately between computers 120a and 120b and resources on the Internet via the established Internet connection.

One benefit of this arrangement is that that the network connection sharing capability of mobile broadband modem 102 does not require a fixed network connection point, as previously required by known devices. Instead, mobile broadband modem 102 employs a mobile phone 112 which is capable of being easily relocated, and, as such, provides significantly greater convenience in providing a portable network connection sharing solution, particularly as wireless communication systems provide higher data rates. This benefit can be appreciated in a large number of applications, including providing internet-sharing solutions in locations otherwise impractical or unavailable.

Another benefit of the particular embodiment depicted in FIG. 1 is that the mobile phone 112 is detachable from the modem housing portion 102, and, thus, is usable as a wireless communication device apart from the modem. Thus, mobile phone 112 may be used by user to conduct other voice and/or data calls apart from the modem housing portion 102.

Also discussed above, the particular embodiment depicted in FIG. 1 provides that a second mobile phone (not shown) may be interfaced with mobile broadband modem 102 when mobile phone 112 is detached from mobile broadband modem 102. Such an arrangement allows the second phone to establish the Internet connection when mobile phone 112 is unavailable. Such an arrangement also allows the transceiver portion of mobile broadband modem 102 to be readily upgraded, since the transceiver is associated with the mobile phone 112 in the particular embodiment discussed above.

Figure 2:
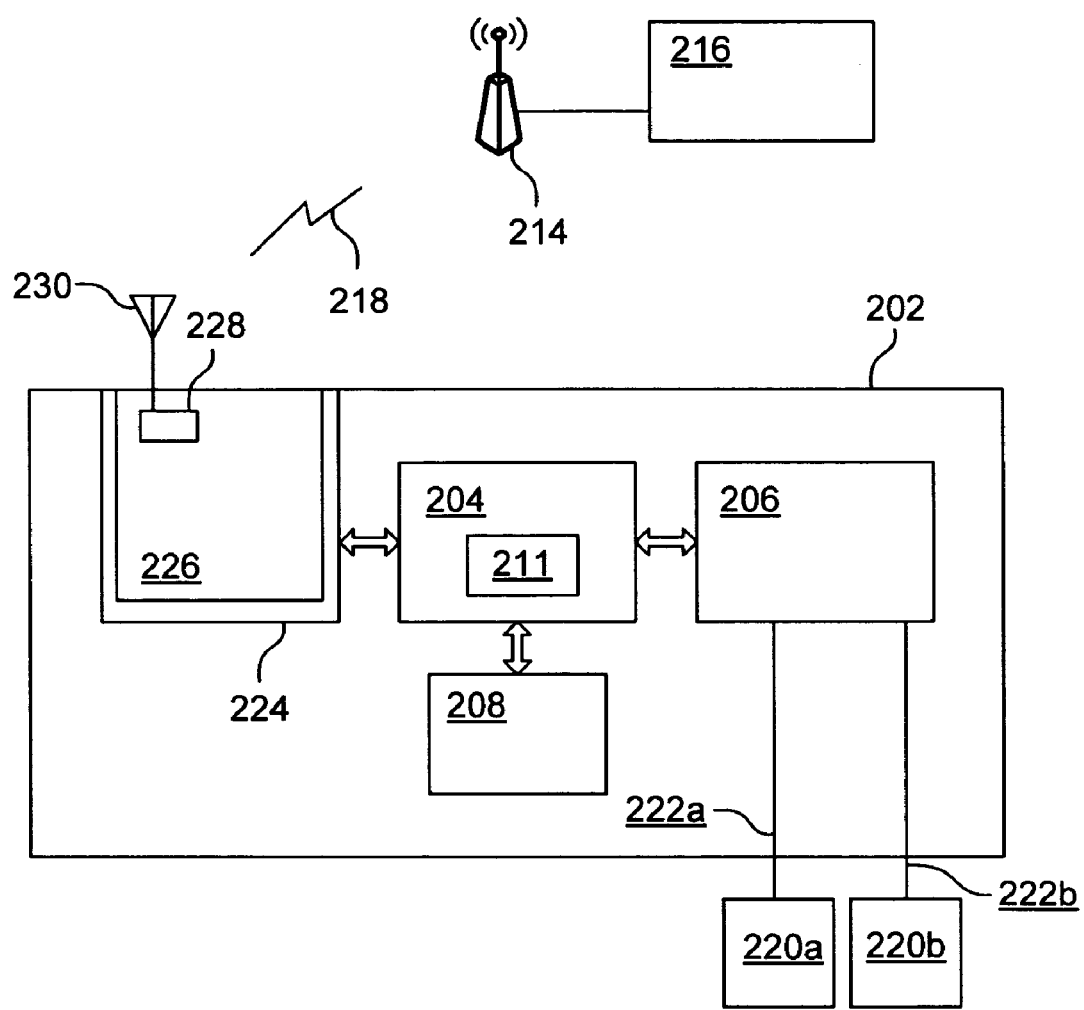
FIG. 2 illustrates an exemplary mobile broadband modem configured to communicably couple with a PC card according to one embodiment of the present invention.

Referring now to FIG. 2, there is shown a simplified block diagram of exemplary mobile broadband modem 202 according to another embodiment of the present invention. Mobile broadband modem 202 is similar to mobile broadband modem 102 of FIG. 1 where processor 204, I/O interface 206, memory 208, network sharing module 211, lines 222a and 222b, computers 220a, 220b, RF link 218, base station 214, and MSC 216 correspond to processor 104, I/O interface 106, memory 108, network sharing module 111, lines 122a and 122b, computers 120a, 120b, RF link 118, base station 114, and MSC 116 of FIG. 1, respectively. However, mobile phone interface 110 and mobile phone 112 of mobile broadband modem 102 in FIG. 1 have been replaced with PC card interface 224 and PC card modem 226 in mobile broadband modem 202.

As shown in FIG. 2, PC card modem 226 includes transceiver 228 coupled to antenna 230 for communicating with base station 214 over RF link 218 in the manner similar to that described above in conjunction with mobile phone 112 of FIG. 1. PC card modem 226 is also capable of being detached from mobile broadband modem 202, and a second PC card modem (not shown) may be used to establish RF communication with base station 214. It is also noted that when PC card modem 226 is detached from mobile broadband modem 202, it may be used with other devices, such as notebook computers equipped with a PC card slot, for example.

Figure 3:
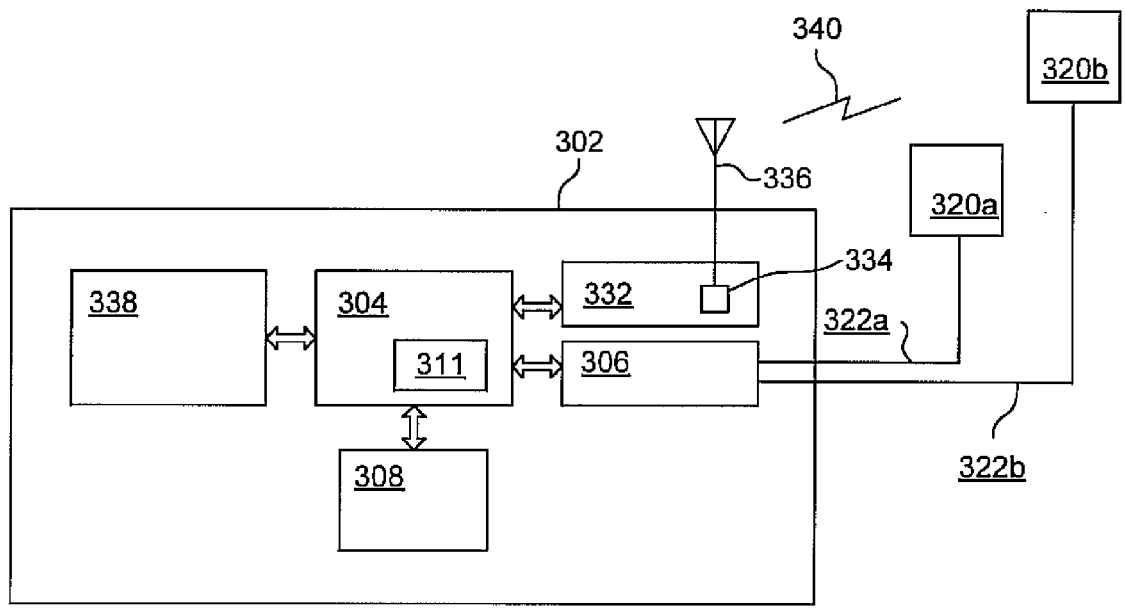
FIG. 3 illustrates an exemplary mobile broadband modem configured to communicably couple with a plurality of computers wirelessly according to one embodiment of the present invention.

Referring now to FIG. 3, there is shown a simplified block diagram of exemplary mobile broadband modem 302 according to another embodiment of the present invention. Mobile broadband modem 302 is similar to mobile broadband modem 102 of FIG. 1 and mobile broadband modem 202 of FIG. 2, where processor 304, I/O interface 306, memory 308, network sharing module 311, lines 322a and 322b, and computers 320a, 320b correspond to processor 104, I/O interface 106, memory 108, network sharing module 111, lines 122a and 122b, and computers 120a, 120b of FIG. 1, respectively (elements corresponding to RF link 118, base station 114, and MSC 116 have been omitted from FIG. 3 for simplicity).

In FIG. 3, block 338 corresponds generally to a wireless communication device and interface to processor 304. As such, block 338 may be mobile phone 112 and mobile phone interface 110 of FIG. 1, PC card modem 226 and PC card interface 224 of FIG. 2, or an embedded wireless communication device and interface coupled to processor 304, for example.

Continuing with FIG. 3, mobile broadband modem 302 further comprises second wireless module 332 including transceiver 334 and antenna 336. Unlike the wireless communication device and interface represented by block 338 for communication with a base station, e.g., via a cellular-based RF link such as CDMA, second wireless module 332 communicates with local computers 320a and 320b via RF link 340. Thus, mobile broadband modem 302 provides a second (or alternative) connection type (in this case, wireless) for coupling local computers 320a and 320b to mobile broadband modem 302. By way of illustration, RF link 340 may be a wireless link established via one or more of the standards, such as IEEE 802.11. In other embodiments, mobile broadband modem 302 may omit I/O interface 306 altogether, thereby providing a wireless-only solution (i.e., a wireless connection to the Internet and a wireless connection to local machines).

Figure 5:
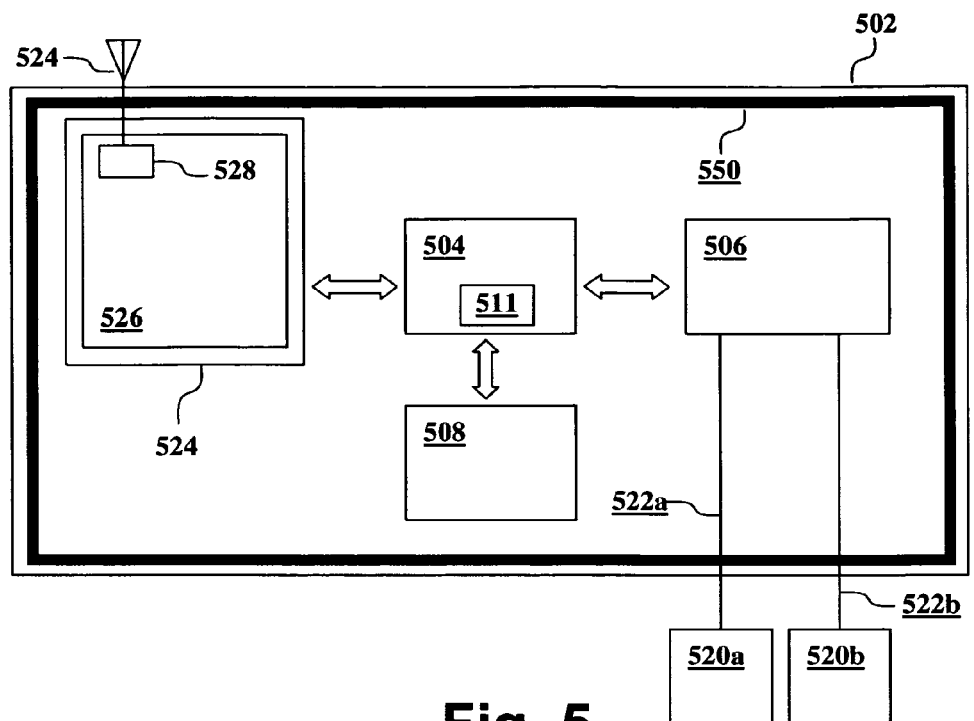
FIG. 5 illustrates an exemplary mobile broadband modem including a secured PC card modem according to one embodiment of the present invention.

Referring now to FIG. 5, there is shown a simplified block diagram of exemplary mobile broadband modem 502 according to another embodiment of the present invention. Mobile broadband modem 502 is similar to mobile broadband modem 202 of FIG. 2 in that PC card modem 526, PC card interface 524, transceiver 528, antenna 530, processor 504, I/O interface 506, memory 508, network sharing module 511, lines 522a and 522b, and computers 520a, 520b correspond to PC card modem 226, PC card interface 224, transceiver 228, antenna 230, processor 204, I/O interface 206, memory 208, network sharing module 211, lines 222a and 222b, and computers 220a, 220b of FIG. 2, respectively (elements corresponding to RF link 218, base station 214, and MSC 216 have been omitted from FIG. 5 for simplicity).

In FIG. 5, mobile broadband modem 502 further comprises chassis 550, which is designed to secure PC card modem 526 from being readily removed. Generally, PC card modems will engage a device via a PC card slot, and can be slidably removed. In order to limit the ability to remove PC card modem 526 from mobile broadband modem 502, at least a portion of chassis 550 is positioned to obstruct the removal path. For example, in one embodiment, PC card modem 526 might be locked in place with just a strategically placed strip, integral with chassis 550, which would likewise prevent removal. In another embodiment, chassis 550 might comprise a plastic casing designed such that it would be necessary to remove the entire casing, or at least unscrew a pre-positioned access panel, in order to unplug PC card modem 526.

In addition, PC card modem 526 need not be situated entirely within mobile broadband modem 502. Any number of standard securing methods could be used that would require more than merely unplugging PC card modem 526 for its removal. These particular embodiments give a product manufacturer the option of incorporating an off-the-shelf PC card modem into a unitary mobile broadband modem while securing the PC card within the chassis. Furthermore, this general configuration offers the advantages of increased serviceability and the flexibility to use alternate PC card modem suppliers without redesigning the entire product. Moreover, a service provider of the PC card modem is able to readily ascertain usage of the PC card for shared use in contrast to a PC card modem for use in a non-shared arrangement since the PC card modem enabled for shared use can be secured to chassis 550 of mobile broadband modem 502 to prevent it from being readily removed, as discussed above.

Figure 6:
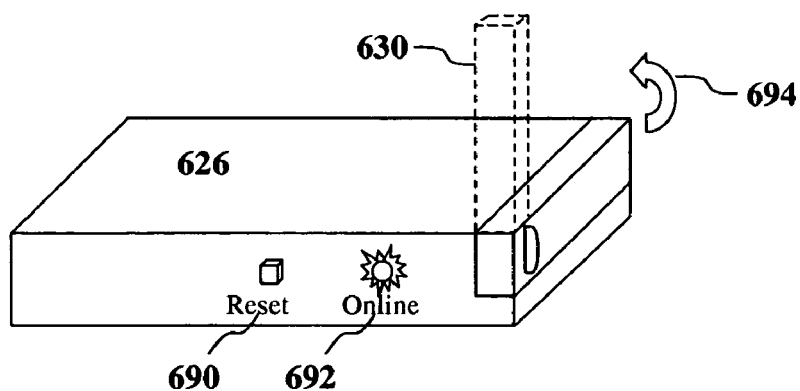
FIG. 6 illustrates an exemplary PC card modem having multiple physical features.

Referring now to FIG. 6, there is shown exemplary PC card modem 626 with a number of physical features. There, PC card modem 626 utilizes the following physical features: multiposition antenna 630 whose position is determined by rotational motion 694, reset button 690, and LED status indicator 692. A PC card modem may also utilize other physical features not shown.

Figure 7:
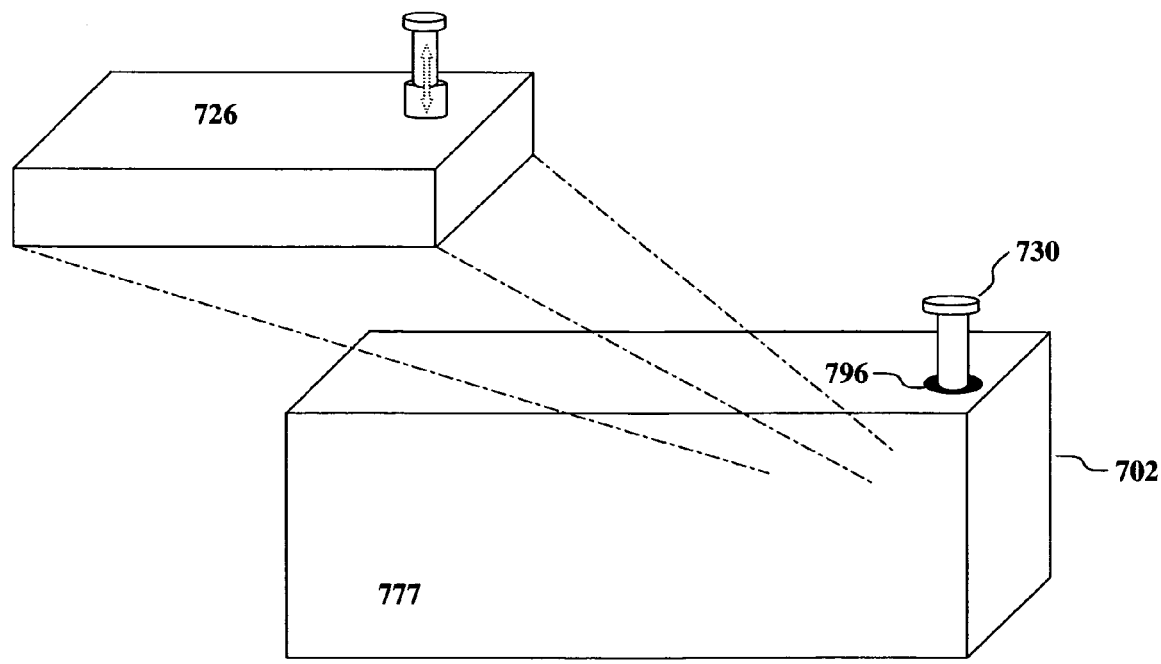
FIG. 7 illustrates an exemplary mobile broadband modem chassis configured to permit access to a secured PC card modem element according to one embodiment of the present invention.

FIG. 7 illustrates yet another embodiment of mobile broadband modem 702 that would further comprise including aperture 796 in chassis 777 in order to provide access to one or more physical features of PC card modem 726 located within, while still securing PC card modem 726.

In the illustrative example of FIG. 7, the physical feature shown is pop-up extendable antenna 730. However, in other embodiments, aperture 796 would allow access to one or more other physical features of PC card modem 726. In this configuration though, the aperture allow access and extension of antenna 730, but otherwise secures PC card modem 726 within chassis 777.

From the above description of exemplary embodiments of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. For example, in other embodiments, the processor of the wireless communication device, e.g., the processor of mobile phone 102 in FIG. 1, may be used instead of a dedicated processor, such as processor 104 in mobile broadband modem 102 of FIG. 1. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

What is claimed is:

1. A modem configured to operate cooperatively with a detachable transceiver for enabling network communication with a cellular network for a plurality of data processing devices, comprising:
   a processor;
   an input/output ("I/O") interface coupled to the processor, the I/O interface capable of being communicably coupled to the plurality of data processing devices;
   a first transceiver interface configured to facilitate data communication between the processor and the detachable transceiver;
   a network sharing module executed by the processor, the network sharing module configured to:
      establish the network communication with the cellular network via the detachable transceiver, and
      allow each of the plurality of data processing devices to establish the network communication with the cellular network via at least the I/O interface, the network sharing module, and the detachable transceiver, wherein the plurality of data devices includes at least two data processing devices.

2. The modem of claim 1 further comprising the first transceiver interface interconnecting the processor and the detachable transceiver;
   wherein the detachable transceiver can be disconnected from the first transceiver interface.

3. The modem of claim 2 wherein the detachable transceiver and a first antenna are housed in a first mobile phone.

4. The modem of claim 3 wherein the first transceiver interface is configured to receive the first mobile phone.

5. The modem of claim 3 wherein the first transceiver interface is further configured to receive a second mobile phone.

6. The modem of claim 2 wherein the detachable transceiver and the first antenna are housed in a first detachable PC card.

7. The modem of claim 6 wherein the first transceiver interface receives the first detachable PC card.

8. The modem of claim 7 further comprising a chassis; wherein the first detachable PC card is secured in the chassis.

9. The modem of claim 8 wherein a portion of the chassis prevents the first detachable PC card from being slidably removed from the modem.

10. The modem of claim 8 wherein the chassis further comprises an aperture for accessing at least one physical element of the first detachable PC card.

11. The modem of claim 7 wherein the first transceiver interface is further configured to receive a second detachable PC card.

12. The modem of claim 2 wherein the modem further comprises a second antenna that is coupled to the detachable transceiver and fixed to the modem.

13. The modem of claim 12 wherein the second antenna is in a diversity arrangement in conjunction with the first antenna.

14. The modem of claim 2 further comprising:
   a second detachable transceiver, and
   a second antenna coupled to the second detachable transceiver,
   wherein the second detachable transceiver is coupled to the processor, and is capable of being communicably coupled to the plurality of data processing devices.

15. A wireless, multi-access modem device configured to operate cooperatively with a detachable transceiver for enabling network communication with a cellular network for a plurality of data processing devices, comprising:
   a processor;
   an input/output ("I/O") interface coupled to the processor, the I/O interface capable of being communicably coupled to the plurality of data processing devices;
   a first transceiver interface configured to facilitate data communication between the processor and the detachable transceiver, wherein the detachable transceiver can be disconnected from the transceiver interface
   a network sharing module executed by the processor, the network sharing module configured to:
      establish the network communication via, with the cellular network via the detachable transceiver, and
      allow each of the plurality of data processing devices to establish the network communication with the cellular network via at least the I/O interface, the network sharing module, and the detachable transceiver, wherein the plurality of data devices includes at least two data processing devices.

16. The modem of claim 15 wherein the detachable transceiver is housed in a first mobile phone.

17. The modem of claim 16 wherein the first transceiver interface is configured to receive the first mobile phone.

18. The modem of claim 17 wherein the first transceiver interface is further configured to receive a second mobile phone.

19. The modem of claim 15 wherein the detachable transceiver is housed in a first detachable PC card.

20. The modem of claim 19 wherein the first transceiver interface is configured to receive the first detachable PC card.

21. The modem of claim 20 further comprising a chassis; wherein the chassis is configured to secure the first detachable PC card within the chassis.

22. The modem of claim 21 wherein the chassis further comprises an aperture for accessing physical elements of the first detachable PC card.

23. The modem of claim 20 wherein the first transceiver interface is further configured to receive a second detachable PC card.

24. The modem of claim 15 wherein the modem further comprises a first antenna that is configured to couple to the detachable transceiver.

25. The modem of claim 15 further comprising:
   an I/O transceiver, and
   a second antenna coupled to the I/O transceiver,
   wherein the I/O transceiver is coupled to the processor, and is capable of being communicably coupled to the plurality of data processing devices.

* * * * *